United States Patent
Lin

(10) Patent No.: US 9,223,359 B2
(45) Date of Patent: Dec. 29, 2015

(54) PERIPHERAL COMPONENT INTERCONNECT (PCI) CARD FIXING SYSTEM

(71) Applicant: Celestica Technology Consultancy (Shanghai) Co., Ltd., Shanghai (CN)

(72) Inventor: Chun-Cheng Lin, Shanghai (CN)

(73) Assignee: CELESTICA TECHNOLOGY CONSULTANCY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/297,264

(22) Filed: Jun. 5, 2014

(65) Prior Publication Data

US 2014/0363999 A1 Dec. 11, 2014

(30) Foreign Application Priority Data

Jun. 6, 2013 (TW) .............................. 102210601 U

(51) Int. Cl.
- H05K 7/02 (2006.01)
- H05K 7/04 (2006.01)
- G06F 1/18 (2006.01)

(52) U.S. Cl.
CPC ...................................... *G06F 1/185* (2013.01)

(58) Field of Classification Search
USPC .................. 361/807, 809, 810, 801–802, 759
See application file for complete search history.

(56) References Cited

U.S. PATENT DOCUMENTS

| | | | | |
|---|---|---|---|---|
| 4,975,805 A * | 12/1990 | Schmutzler | .................... | 361/754 |
| 5,657,210 A * | 8/1997 | Yamanaka | .................... | 361/814 |
| 5,676,553 A * | 10/1997 | Leung | .............................. | 439/74 |
| 5,822,183 A * | 10/1998 | Kanda et al. | ............. | 361/679.32 |
| 6,760,218 B2 * | 7/2004 | Fan | .......................... | 361/679.02 |
| 7,136,291 B2 * | 11/2006 | Tu et al. | ........................ | 361/797 |
| 8,218,335 B2 * | 7/2012 | Moore et al. | .................. | 361/801 |
| 8,953,281 B1 * | 2/2015 | Lee et al. | ................... | 360/99.15 |

* cited by examiner

Primary Examiner — Hung S Bui
(74) Attorney, Agent, or Firm — Novak Druce Connolly Bove + Quigg LLP

(57) ABSTRACT

A fixing system for fixing a PCI card includes: a module having a substrate including carrier portion, a pivot portion and a securing portion; and a press rod having a pivot section connected pivotally to the pivot portion of the substrate, an extension section and a securing section; wherein, the press rod is pivotable relative to the module between a locked position, in which the securing section of the press rod engages the securing portion of the substrate such that the extension section thereof compresses so as to fix the PCI card on the carrier portion of the substrate and an open position, in which the press rod is rotatable about a common axis defined by the pivot section and the pivot portion, thereby permitting the press rod to rotate away from the substrate.

9 Claims, 7 Drawing Sheets

PERIPHERAL COMPONENT INTERCONNECT (PCI) CARD FIXING SYSTEM

CROSS-REFERENCE TO RELATED APPLICATION

This application claims the priority of Taiwanese patent application No. 102210601, filed on Jun. 6, 2013, which is incorporated herewith by reference.

BACKGROUND OF THE INVENTION

1. Field of the Invention

The present invention relates generally to a fixing system, and more particularly to a PCI card fixing system, which utilizes a plurality of press rods to interactively compress one another for stably fixing an expansion card on a substrate.

2. The Prior Arts

PCI is an initialism of Peripheral Component Interconnect and is a local bus connection for a Personal Computer. PCI specification has adopted several standardized formats, physical parameters (including bandwidth) and protocols for connecting hardware devices to a PC. The hardware devices or peripheral devices include expansion cards (PCI cards), such as network card, sound card, modem, TV tuner card, USB ports and a disk controller. A conventional PCI card has a bent section at its distal end for being fixed to a computer casing.

In the prior arts, fastener screws are used for detachably fixing an expansion card on a frame or bracket of computer casing. It is noted that during the installation, a notch formed at the bent section of the expansion card is held in such a manner to align the notch with a fastening hole of the bracket. After which, a fastener screw is inserted through the notch and is fastened threadedly into the fastening hole in order fix the expansion card on the computer casing. Since operating tools are required for tightening or un-tightening the screws, the operator encounters difficulty if the screw gets loss. Hence, the manufacturers are urgently trying to solve the presently existing problem, to develop a fixing system with tool free locking design.

SUMMARY OF THE INVENTION

A primary objective of the present invention is to provide an expansion card fixing system, in which a limited space is utilized effectively in order to fix the expansion card on a designated position on a substrate or a casing.

Another objective of the present invention to provide an expansion card fixing system, in which a protrusion and a sphere-shaped structure having a curved surface for complementing with the protrusion are used to fix the expansion card, and in which a plurality of press rods are used to interactively compress one another for stably fixing an expansion card on a substrate or casing.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
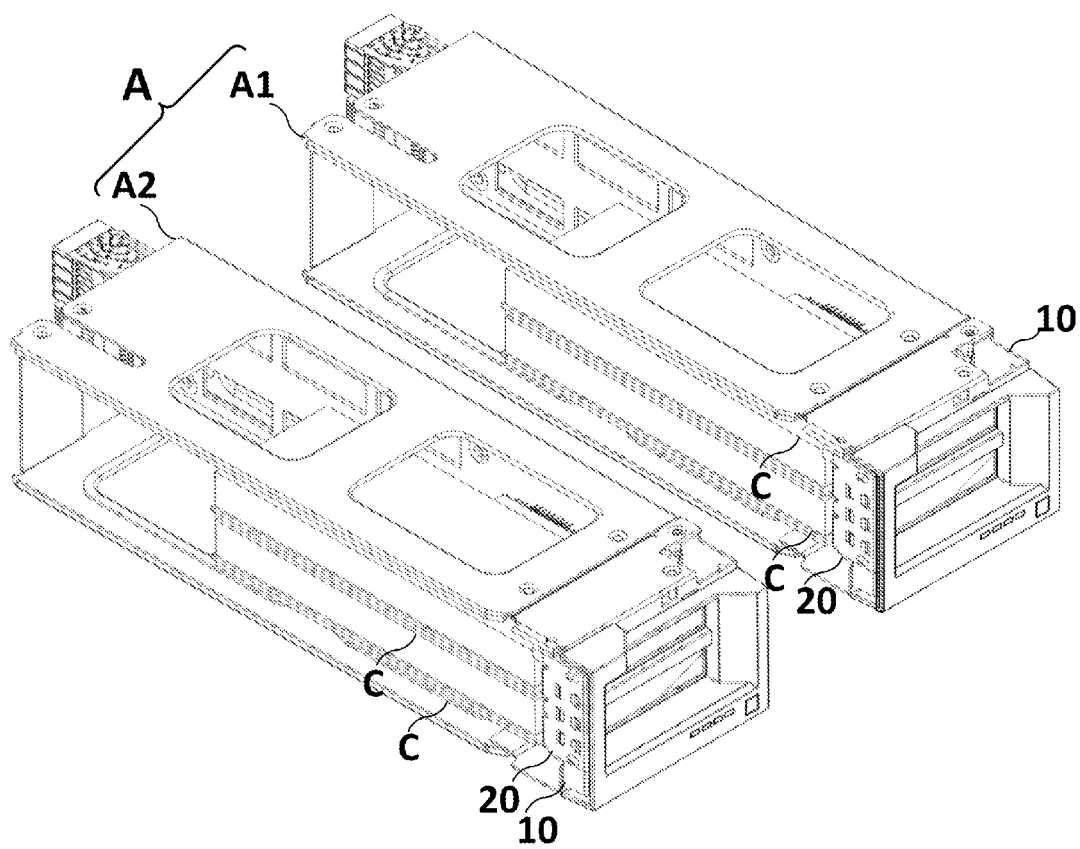
FIG. 1 is a perspective view of an expansion card fixing system of the present invention, wherein a press rod of the fixing system is shown in a locking position relative to a module in order to fix an expansion card.
Figure 2A:
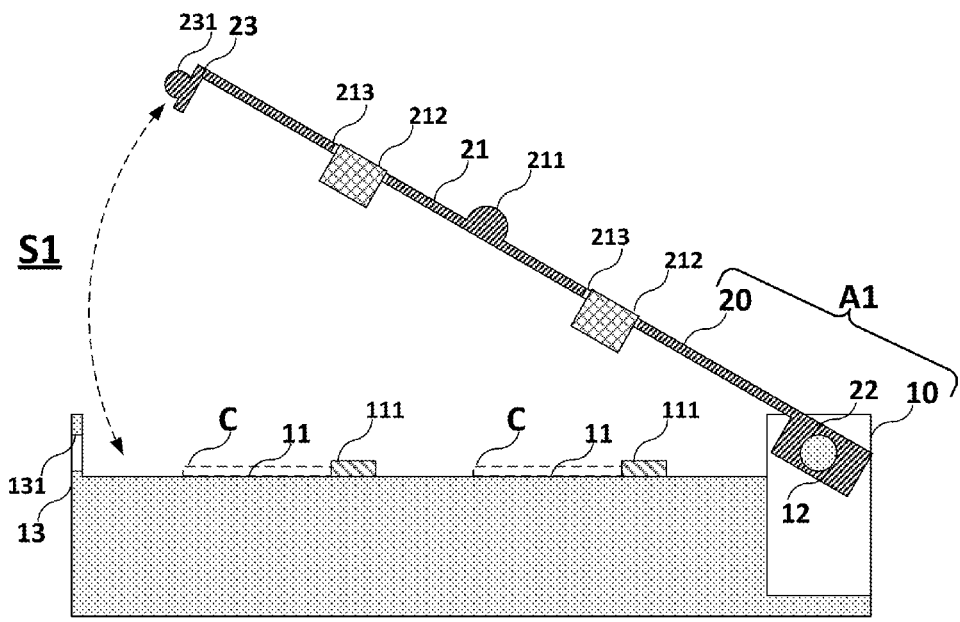
FIGS. 2A and 2B respectively illustrate the card fixing system of the present invention, wherein the press rod of the fixing system is shown in the locking and open positions relative to the module.
Figure 2B:
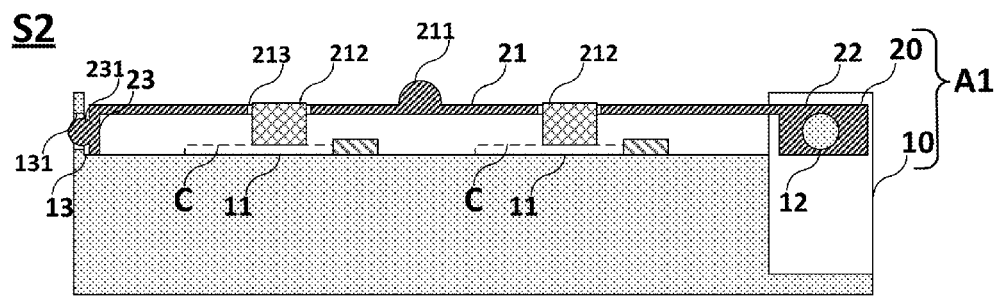
Figure 2C:
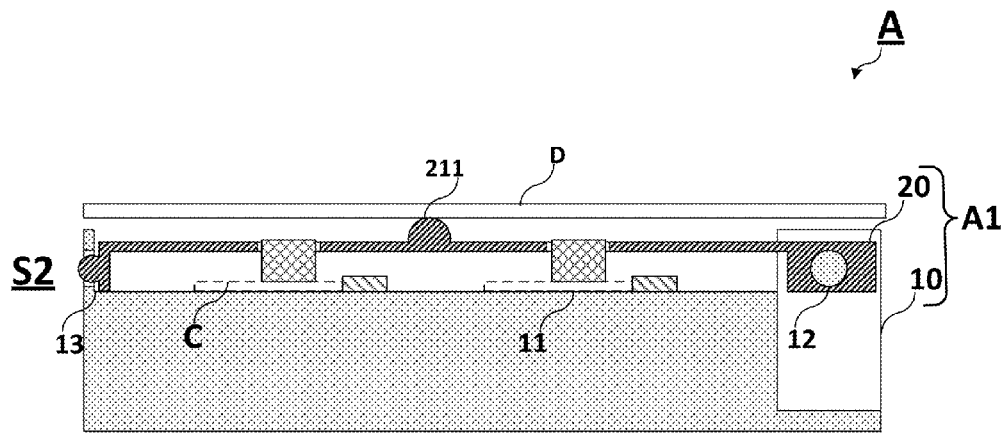
FIGS. 2C and 2D respectively illustrate the card fixing system of the present invention, wherein the fixing system includes first and second modules and their relationship.
Figure 2D:
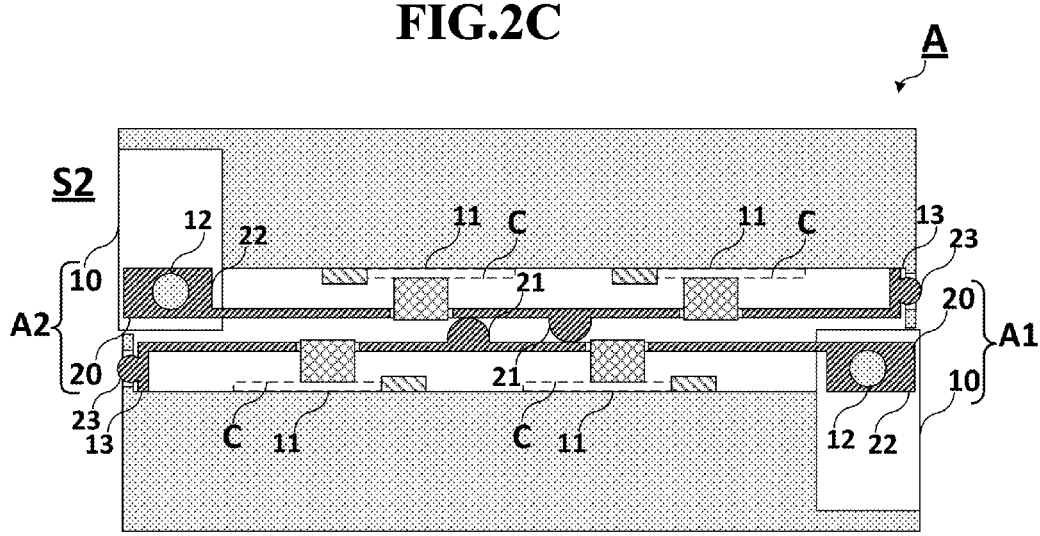
Figure 3A:
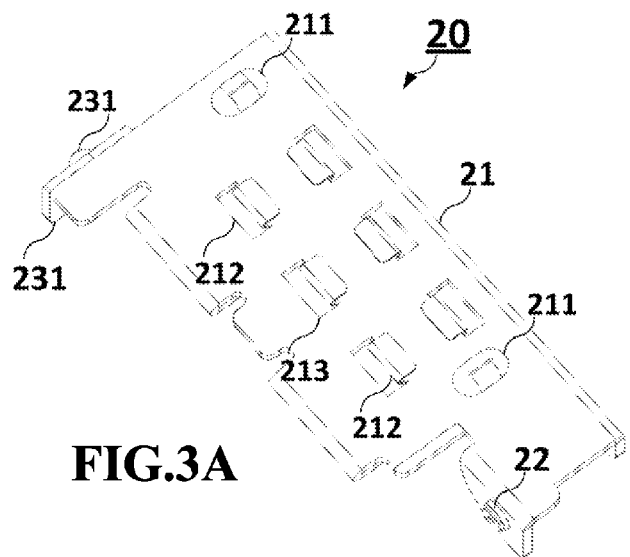
FIGS. 3A, 3B and 3C respectively show the press rod employed in the card fixing system of the present invention at different angles.
Figure 3B:
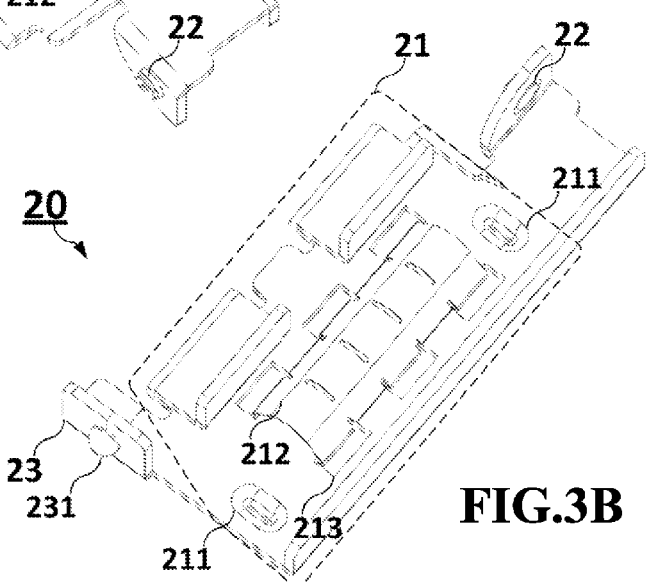
Figure 3C:
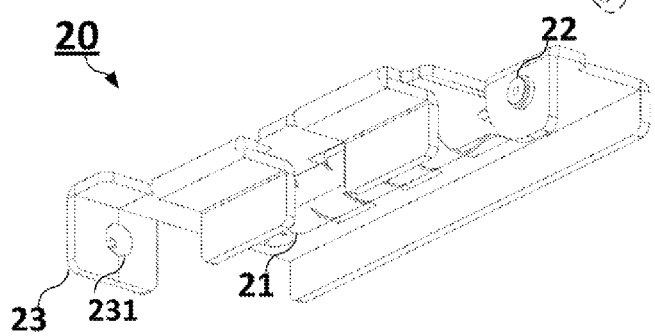
Figure 4:
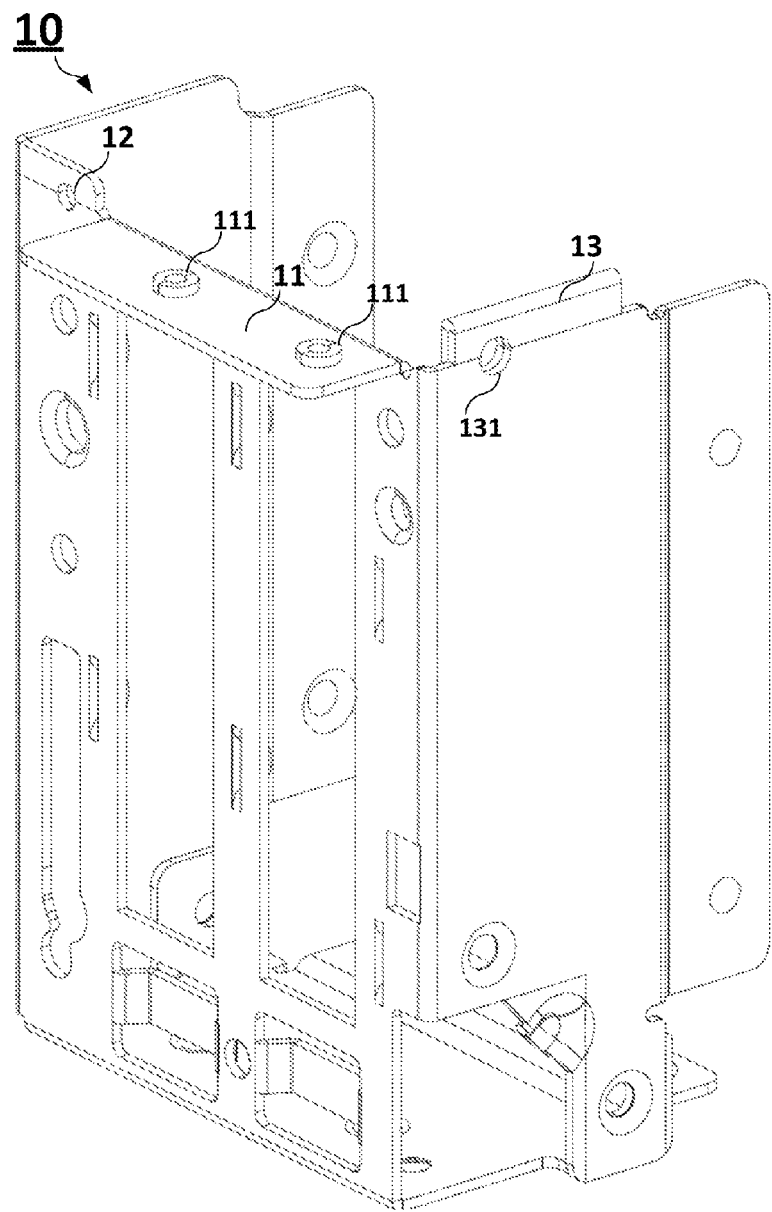
FIG. 4 shows a perspective view of a substrate of a first module in the fixing system of the present invention.
Figure 5A:
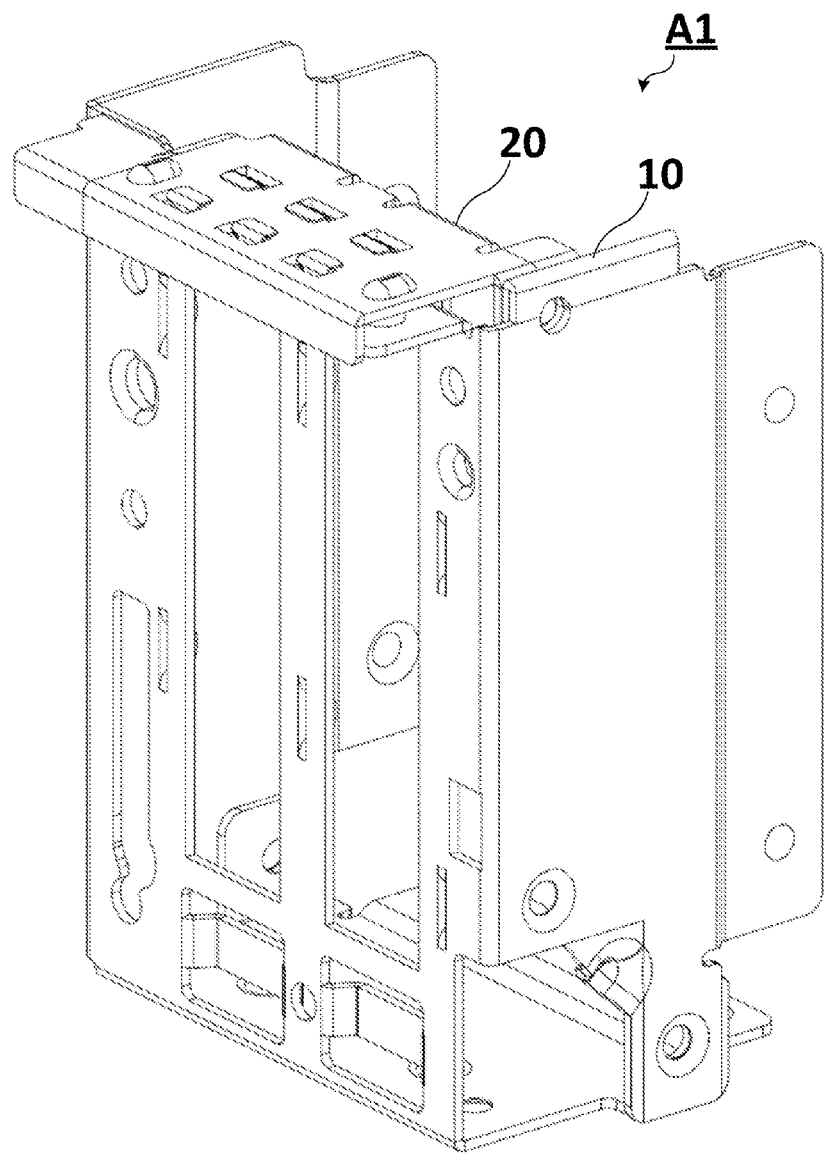
FIGS. 5A and 5B respectively show a perspective view of the substrate and the press rod of the first module in the fixing system of the present invention.
Figure 5B:
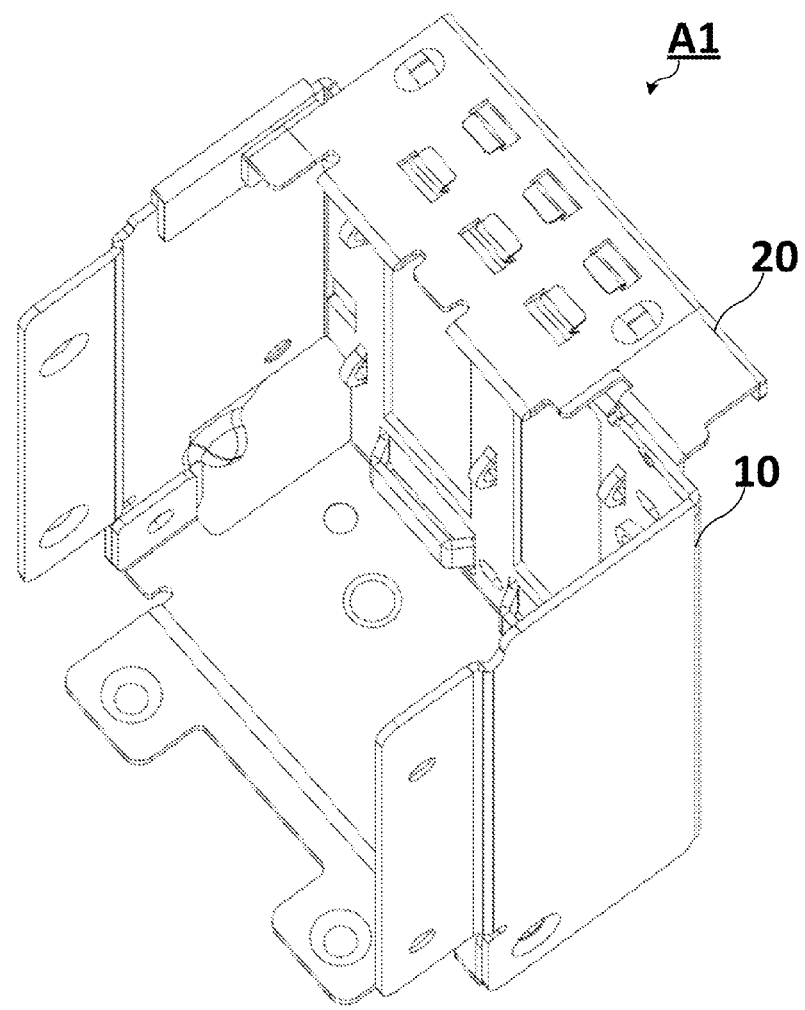

Referring to FIGS. 1 and 5, wherein FIG. 1 is a perspective view of an expansion card fixing system of the present invention, wherein a press rod of the fixing system is shown in a locking position relative to a module in order to fix an expansion card; FIGS. 2A and 2B respectively illustrate the card fixing system of the present invention, wherein the press rod of the fixing system is shown in the locking and open positions relative to the module; FIGS. 2C and 2D respectively illustrated the card fixing system of the present invention, wherein the fixing system includes first and second modules and their relationship; FIGS. 3A, 3B and 3C respectively show the press rod employed in the card fixing system of the present invention at different angles; FIG. 4 shows a perspective view of a substrate of a first module in the fixing system of the present invention; and FIGS. 5A and 5B respectively show a perspective view of the substrate and the press rod of the first module in the fixing system of the present invention. As illustrated, the fixing system of the present invention is used for fixing an expansion card C to a designated place within a casing includes a first module A1, which is in form of a casing, a connector, a frame or assembled body. The first module A1 includes a first substrate 10 and a first press rod 20.

The first substrate 10 has a carrier portion 11 for carrying the expansion card C thereon, a pivot portion 12 located at one end of the carrier portion 11 and a securing portion 13 located at another end of the carrier portion 11 so as to be opposite to the pivot portion 12.

Referring to FIGS. 3A~3C, the press rod 20 can be configured in plate form as shown and has a pivot section 22 connected pivotally to the pivot portion 12 of the first substrate 10, an extension section 21 extending outward and longitudinally from the pivot section 22 and a securing section 23 located at one end of the extension section 21 so as to be opposite to the pivot section 22.

The first press rod 20 is pivotable relative to the first module A1 between a locked position S2, in which the securing section 23 of the first press rod 20 engages the securing portion 23 of the first substrate 10 (see FIG. 2B) such that the extension section 21 thereof compresses so as to fix the expansion card C on the carrier portion 11 and an open position S1, in which the first press rod 20 is rotatable about a common axis defined by the pivot section 22 and the pivot portion 12, thereby permitting the first press rod 20 to rotate away from the first substrate 10 (see FIG. 2A).

Preferably, the extension section 21 of the first press rod 20 has an inner side surface that faces the carrier portion 11 and that is formed with a plurality of retention holes 213 in which a plurality of resilient strips 212 are embedded such that the resilient strips 212 compress the expansion card C resiliently when the first press rod 20 is at the locked position as best shown in FIG. 2B.

In this embodiment, wherein one of the securing portion 13 and the securing section 23 is formed with a first recess 131 while the other one of the securing portion 13 and the securing section 23 is formed with a first protrusion 231 configured to match and engage fittingly and interactively relative to each other (see FIGS. 3A~3C). Note that the first protrusion 231 is a sphere-shaped structure having a curved surface to facilitate sliding into or sliding out from the first recess 131. The structure of the first protrusion 231 should not be limited only to the sphere any other designs providing the same function may be implemented.

In one embodiment of the present invention, the extension section 21 of the first press rod 20 has an inner side surface facing the carrier portion 11 of the first substrate 10 and an outer side surface that is opposite to the inner side surface and that is formed with a projection 211 extending outward from the outer side surface in a normal vector direction.

The fixing system of the present invention further includes a second module A2 that is adapted to be disposed on the first module A1 in use with the first press rod 20 is at the locked position S2, as best shown in FIGS. 2C and 2D. The second module A2 has an abutment surface D abutted against by the projection 211 of the first press rod 20 such that the second module A2 creates an additional compress force on the expansion card C for fixing the expansion card C more stably on the carrier portion 11 of the first substrate 10.

Under this condition, the second module A2 includes a second substrate 10 having a carrier portion 11 for carrying another expansion card C thereon, a pivot portion 12 located at one end of the carrier portion 11 and a securing portion 13 located at another end of the carrier portion 11 so as to be opposite to the pivot portion 12. The second press rod 20 has a pivot section 22 connected pivotally to the pivot portion 12 of the second substrate 10, an extension section 21 extending outward from the pivot section 22 and having the abutment surface D abutted against by the projection 211 of the first press rod 20 in a normal vector direction and a securing section 23 located at one end of the extension section 21 so as to be opposite to the pivot section 22.

Once the second module A2 is removed or separated from the first module A1 or prior to disposing on the first module A1, the second press rod 20 is pivotable relative to the second module A2 between a locked position S2, in which the securing section 23 of the second press rod 20 engages the securing portion of the second substrate such that the extension section 21 of the second press rod 20 compresses so as to fix another expansion card C on the carrier portion 11 of the second substrate 10 and an open position S1, in which the second press rod 20 is rotatable about a common axis defined by the pivot section 22 and the pivot portion 12, thereby permitting the second press rod 20 to rotate away from the second substrate 10.

Preferably, the first and second substrates 10 and the first and second press rods 20 of the first and second modules A1, A2 are identical so that the protrusion and the recess thereof interactively engage relative to each other. As explained above, the limited space is utilized effectively by providing the projection 211 on the abutment surface of the press rod to abut against another module D to create additional force for compressing the expansion card C.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fixing system for fixing an expansion card, comprising:
    a first module including
        a first substrate having a carrier portion for carrying the expansion card thereon, a pivot portion located at one end of said carrier portion and a securing portion located at another end of said carrier portion so as to be opposite to said pivot portion, and
        a first press rod having a pivot section connected pivotally to said pivot portion of said first substrate, an extension section extending outward from said pivot section and a securing section located at one end of said extension section so as to be opposite to said pivot section;
    wherein, said first press rod is pivotable relative to said first module between a locked position, in which said securing section of said first press rod engages said securing portion of said first substrate such that said extension section thereof compresses so as to fix the expansion card on said carrier portion and an open position, in which said first press rod is rotatable about a common axis defined by said pivot section and said pivot portion, thereby permitting said first press rod to rotate away from said first substrate.

2. The fixing system according to claim 1, wherein one of said securing portion and said securing section is formed with a first recess while the other one of said securing portion and said securing section is formed with a first protrusion configured to match and engage fittingly and interactively relative to each other.

3. The fixing system according to claim 2, wherein said first protrusion is a sphere-shaped structure having a curved surface.

4. The fixing system according to claim 1, wherein said extension section of said first press rod has an inner side surface facing and said carrier portion of said first substrate and an outer side surface that is opposite to said inner side surface and that is formed with a projection extending outward from said outer side surface in a normal vector direction.

5. The fixing system according to claim 4, further comprising a second module that is adapted to be disposed on said first module in use with said first press rod is at said locked position, said second module having an abutment surface D abutted against by said projection of said first press rod such that said second module creates an additional compress force on the expansion card for fixing the expansion card on said carrier portion of said first substrate.

6. The fixing system according to claim 5, wherein said second module includes
    a second substrate having a carrier portion for carrying another expansion card thereon, a pivot portion located at one end of said carrier portion and a securing portion located at another end of said carrier portion so as to be opposite to said pivot portion, and
    a second press rod having a pivot section connected pivotally to said pivot portion of said second substrate, an extension section extending outward from said pivot section and having said abutment surface abutted against by said projection of said first press rod and a securing section located at one end of said extension section so as to be opposite to said pivot section;

wherein, once said second module is removed from said first module or prior to disposing said second module on said first module, said second press rod is pivotable relative to said second module between a locked position, in which said securing section of said second press rod engages said securing portion of said second substrate such that said extension section of said second press rod compresses so as to fix another expansion card on said carrier portion of said second substrate and an open position, in which said second press rod is rotatable about a common axis defined by said pivot section and said pivot portion, thereby permitting said second press rod to rotate away from said second substrate.

7. The fixing system according to claim 6, wherein one of said securing portion and said securing section of said second module is formed with a second recess while the other one of said securing portion and said securing section of said second module is formed with a second protrusion configured to match and engage fittingly and interactively relative to each other.

8. The fixing system according to claim 7, wherein said second protrusion is a sphere-shaped structure having a curved surface.

9. The fixing system according to claim 6, wherein said first and second substrates and said first and second press rods of said first and second modules are identical relative to each other.

* * * * *